(12) United States Patent
Zeitlin et al.

(10) Patent No.: US 10,167,134 B2
(45) Date of Patent: Jan. 1, 2019

(54) ARTICLE CARRIER FOR AN ELECTRONIC VAPING DEVICE

(71) Applicant: Altria Client Services LLC, Richmond, VA (US)

(72) Inventors: Gavriel Zeitlin, Beit Shemesh (IL); David Rubli, Revava (IL); Uzi Malimovka, Givat Shmuel (IL)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 394 days.

(21) Appl. No.: 14/882,019

(22) Filed: Oct. 13, 2015

(65) Prior Publication Data

US 2017/0101256 A1 Apr. 13, 2017

(51) Int. Cl.
| | |
|---|---|
| *A24F 15/20* | (2006.01) |
| *B65D 85/20* | (2006.01) |
| *A24F 47/00* | (2006.01) |
| *H02J 7/00* | (2006.01) |
| *A45C 11/00* | (2006.01) |
| *A45C 13/00* | (2006.01) |
| *A24F 15/18* | (2006.01) |

(52) U.S. Cl.
CPC ............. *B65D 85/20* (2013.01); *A24F 15/18* (2013.01); *A24F 15/20* (2013.01); *A24F 47/008* (2013.01); *A45C 11/00* (2013.01); *A45C 13/005* (2013.01); *H02J 7/0042* (2013.01); *H02J 7/0052* (2013.01); *H02J 2007/0062* (2013.01)

(58) Field of Classification Search
CPC .......... A24F 15/08; A24F 15/18; A24F 47/00; A24F 47/008; A24F 15/20; A24F 15/00; B65D 85/10; B65D 85/20
USPC ......... 206/242, 443, 261, 263; 220/839, 836
See application file for complete search history.

(56) References Cited

U.S. PATENT DOCUMENTS 3,043,354 A * 7/1962 Fitzgerald ............. B65D 25/04
16/225
3,616,487 A * 11/1971 Dearth ...................... E05D 1/02
16/225

(Continued)

FOREIGN PATENT DOCUMENTS

| CH | 380299 | 7/1964 |
| DE | 9303971 U1 | 7/1993 |

(Continued)

OTHER PUBLICATIONS

International Search Report corresponding to International Application No. PCT/EP2016/074633 dated Feb. 7, 2017.

*Primary Examiner* — Steven A. Reynolds
(74) *Attorney, Agent, or Firm* — Harness, Dickey & Pierce, PLC

(57) ABSTRACT

At least one example embodiment discloses an article carrier for an electrical vaping device. The article carrier may include a base portion, a lid portion and a hinge. The base portion may include a first edge region and the lid portion includes a second edge region. The hinge may include a connector band and first and second anchors. The connector band connects the first edge region of the base portion to the second edge region of the lid portion and may include a recessed top portion and a relieved lower portion. The recessed top portion may include a recess. And the relieved lower portion may include a relief for receiving the first and second edge regions.

11 Claims, 6 Drawing Sheets

(56) References Cited

U.S. PATENT DOCUMENTS

| | | | | | |
|---|---|---|---|---|---|
| 4,753,351 | A | * | 6/1988 | Guillin | B65D 1/26 |
| | | | | | 206/518 |
| 5,242,696 | A | * | 9/1993 | McDevitt | B65D 43/162 |
| | | | | | 220/264 |
| 5,413,239 | A | * | 5/1995 | Rider, Jr. | B65D 43/162 |
| | | | | | 16/225 |
| 5,667,094 | A | * | 9/1997 | Rapchak | B65D 43/162 |
| | | | | | 215/306 |
| 6,681,933 | B1 | * | 1/2004 | Demsien | A45C 11/34 |
| | | | | | 206/214 |
| 8,261,933 | B2 | * | 9/2012 | Kidd | B65D 75/22 |
| | | | | | 220/324 |
| 2001/0006153 | A1 | * | 7/2001 | Merrell | B65D 43/162 |
| | | | | | 206/721 |
| 2013/0312775 | A1 | * | 11/2013 | Cortesi | A24F 13/18 |
| | | | | | 131/237 |
| 2015/0164138 | A1 | * | 6/2015 | Liu | H01M 2/1044 |
| | | | | | 206/268 |
| 2016/0081390 | A1 | * | 3/2016 | Ackerman | A24C 5/40 |
| | | | | | 206/86 |

FOREIGN PATENT DOCUMENTS

| | | |
|---|---|---|
| EP | 1475007 A1 | 11/2004 |
| WO | WO-0016656 A1 | 3/2000 |

\* cited by examiner

ARTICLE CARRIER FOR AN ELECTRONIC VAPING DEVICE

FIELD

The present disclosure relates to an article carrier for an electronic vaping device.

BACKGROUND

This section provides background information related to the present disclosure which is not necessarily prior art.

Recently, various articles of electronic appliances are available due to development of electronic industries. In particular, the electronic appliances are gradually becoming smaller, leaner and lighter in order to meet demand of consumers while functions thereof are becoming more various. Electronics manufacturers are focusing upon small electronic function groups and problem free interaction with electronics including safekeeping and handling of the same.

Electronic vaping devices are subject to the same effects of the rest of the electronics industry. It is possible to carry electronic vaping devices in a person's clothing or clothing article such as a pocket or a handbag.

In some instances, an electronic vaping device that is kept in a person's clothes or clothing article is kept in an electronic article carrier. These electronic article carriers are made of various materials and the articles of the electronic article carriers are connected in various ways. Some carriers include a base portion and a lid or cover. The base portion may be connected to the lid by a hinge so a person can access the electrical device inside of the carrier.

SUMMARY

This section provides a general summary of the disclosure, and is not a comprehensive disclosure of its full scope or all of its features.

Hinges typically protrude from a surface of an electronic article carrier. However, in such designs, the protruding hinge could cause cuts, scratches and clothing snags to people reaching in a pocket to grab the article carrier.

Disclosed is an article carrier for an electrical device. The article carrier may include a base portion, a lid portion and a hinge. The base portion may include a first edge region and the lid portion may include a second edge region. In an example embodiment, the hinge may include a connector band and first and second anchors. The connector band connects the first edge region of the base portion to the second edge region of the lid portion and may include a recessed top portion and a relieved lower portion. The recessed top portion may include a recess. And the relieved lower portion may include a relief for receiving the first and second edge regions.

Some example embodiments are configured such that a width of the connector band is at least as long as a thickness of the first edge region together with a thickness of the second edge region and the width of the connector band is about equal to the thickness of the second edge region; the connector band may further include a first end region and a second end region, the first end region opposes the first end region. The connector band may be made of an elastomeric material such as rubber or plastic.

In a yet further example embodiment, the recessed top portion may be configured to be generally planar when the first end region is repositioned one hundred and eighty degrees relative to the second end region. And a surface of the connector band is generally tangential to a surface of the first edge region when the first edge region is positioned one hundred and eighty degrees relative to the second end region, i.e., when the article carrier is in a closed configuration.

In further example embodiments, the article carrier includes a plurality of device receptacles on an interior of the base portion. At least one of the receptacles is configured to retain a Universal Serial Bus ("USB") device. At least one of the receptacles is configured to retain an electronic vaping device pre-vapor formulation cartridge. And at least one of the receptacles is configured to retain an electronic vaping device power cartridge.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected example embodiments and not all possible implementations, and are not intended to limit the scope of the present disclosure.

Corresponding reference numerals indicate corresponding parts throughout the several views of the drawings.

DETAILED DESCRIPTION

Figure 1:
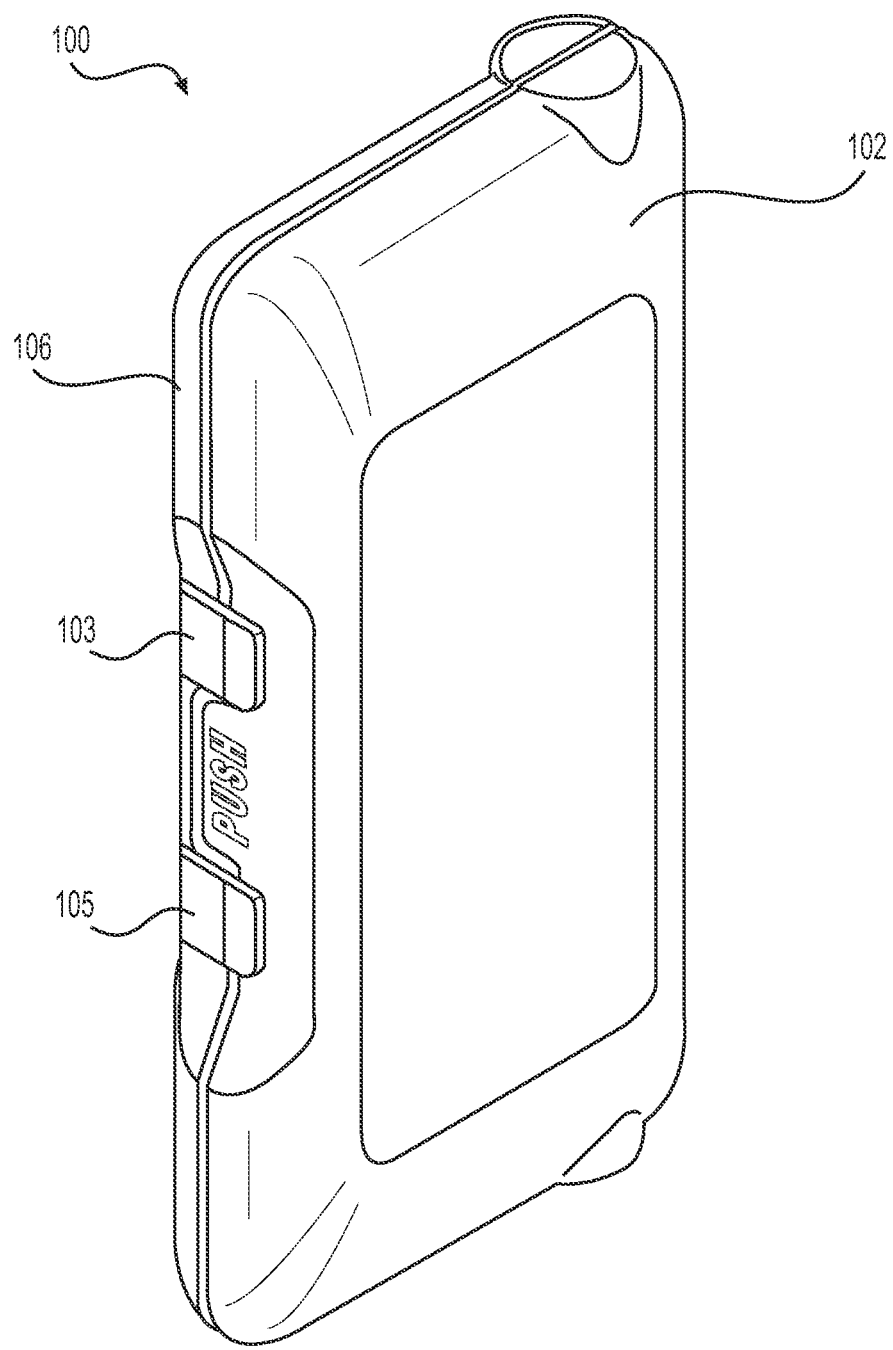
FIG. 1 illustrates an article carrier for an electronic device according to an example embodiment.

Example embodiments will now be described more fully with reference to the accompanying drawings.

Example embodiments are provided so that this disclosure will be thorough, and will fully convey the scope to those who are skilled in the art. Numerous specific details are set forth such as examples of specific articles, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including" and "having," are inclusive and therefore specify the presence of stated features, integers, steps, operations, elements, and/or articles, but do not preclude the presence or addition of one or more other features, integers, steps, operations, elements, articles, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, articles, regions, layers and/or sections, these elements, articles, regions, layers and/or sections should not be limited by these terms. These terms may be only used to distinguish one element, article, region, layer or section from another region, layer or section. Terms such as "first," "second" and other numerical terms when used herein do not imply a sequence or order unless clearly indicated by the context. Thus, a first element, article, region, layer or section discussed below could be termed a second element, article, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an example embodiment of an article carrier 100 for securing an electronic device. The article carrier 100 includes a base portion 102, a lid portion 106, latches 103 and 105 and a hinge 110 (shown in FIG. 2). The base portion 102 and lid portion 106 are configured to rotate about the hinge 110.

Figure 2:
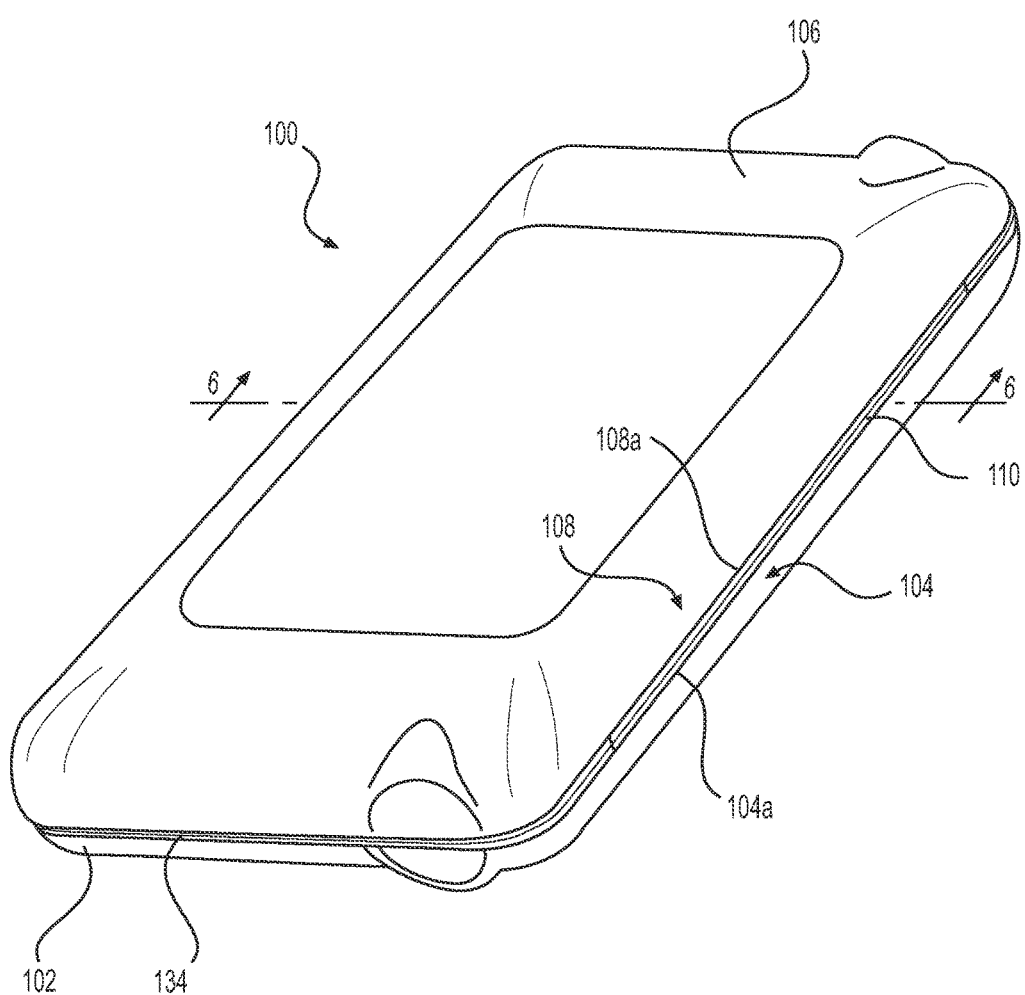
FIG. 2 illustrates a perspective top view of the article carrier for an electronic device in an closed configuration.

FIG. 2 illustrates an additional view of the article carrier 100. The base portion 102 includes a first edge region 104 and the lid portion 106 includes a second edge region 108. The first edge region 104 of the base portion 102 is generally an area defined by any of the extreme edges of the base portion 102 and the center of the base portion 102. For example, the first edge region 104 may be a portion of the base portion 102 that is at or near an edge 104a of the base portion 102. The first edge region 104 may, but does not necessarily include, the edge 104a of the base portion 102. The first edge region 104 is generally any portion of the base portion 102 between a center of the base portion 102 and any edge of the base portion 102. The first edge region 104 may also include two adjacent edges such as a corner of the base portion 102. In the example embodiment shown in FIG. 2, the edge region 104 of the base portion 102 is generally limited by the edge 104a of the base portion 102.

With continued reference to FIG. 2, the second edge region 108 of the lid portion 106 is generally an area defined by any of the extreme edges of the lid portion 106 and the center of the lid portion 106. For example, the second edge region 108 is a portion of the lid portion 106 that is at or near an edge 108a of the lid portion 106. The second edge region 108 may, but does not necessarily include the edge 108a of the lid portion 106. The second edge region 108 is generally any portion of the lid portion 106 between a center of the lid portion 106 and any edge of the lid portion 106. The second edge region 108 may also include two adjacent edges such as a corner of the lid portion 106. The edge region 108 of the lid portion 106 is generally limited by the edge 108a of the lid portion 106.

Figure 3:
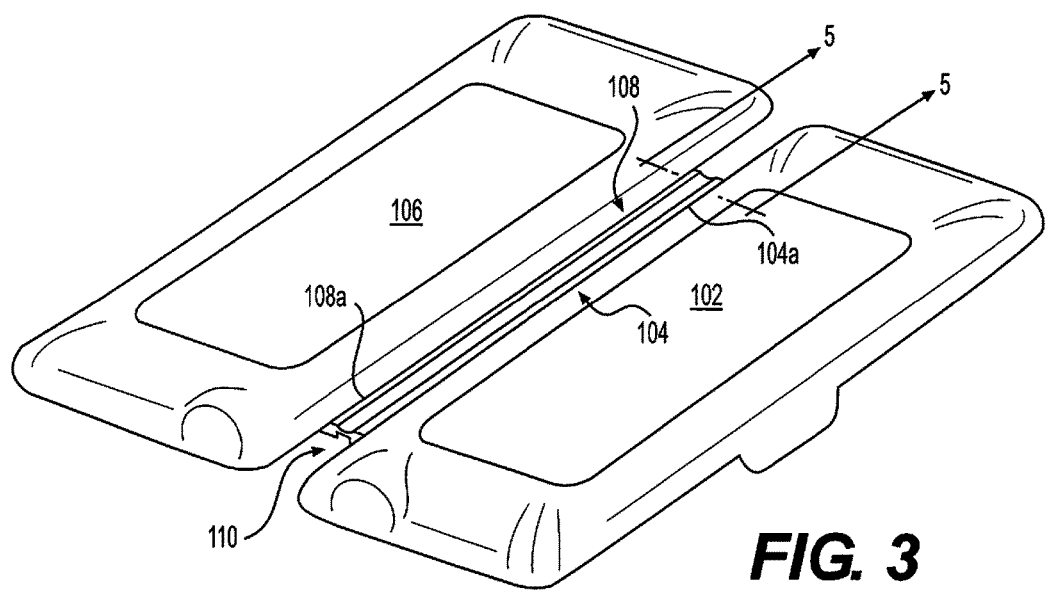
FIG. 3 illustrates a perspective external view of the article carrier for an electronic device in an open configuration.

FIG. 3 illustrates an example embodiment of the article carrier 100 in an open configuration. As shown, the base portion 102 is a generally concave or cupped structure. The lid portion 106 is similarly shown as a concave or cup shaped structure.

Figure 4:
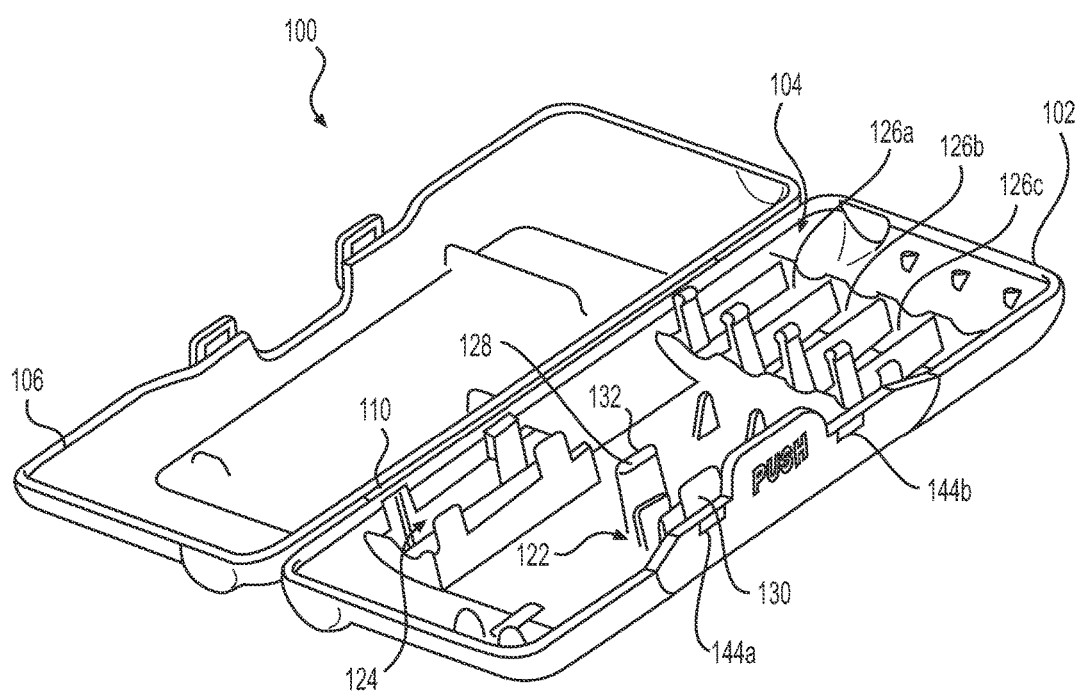
FIG. 4 illustrates a perspective internal view of the article carrier for an electronic device in an open configuration.

As shown in FIG. 4, the base portion 102 may securely retain the electronic device (e.g., an electronic vaping device) in place. For example, the article carrier 100 may have retaining structures on an interior of the base portion 102 for sections of the electronic vaping device. A first receptacle 122 may retain a battery section of an electronic vaping device. A second receptacle 124 may retain a charging section (e.g., a USB charging device) for the electronic vaping device. And third receptacles 126a, 126b and 126c may retain replacement pre-vapor formulation cartridges for the electronic vaping device.

Each of the receptacles 122, 124, and 126a-126c mechanically retains electronic vaping device sections in place. For example, the first receptacle 122 is a clip that includes opposing arms 128 and 130. At the end of each arm 128 and 130 is a retention head 132. The retention head 132 of arm 128, for example, faces an opposing retention head (not shown) of the arm 130. An electronic device section that is placed between the opposing arms 128 and 130 may be retained in the receptacles by the retention heads.

With further reference to FIGS. 3 and 4, a depth of the base portion 102 may be dependent on the use of the article carrier 100 or it may be dependent on the specifications set by the carrier designer. For example, the depth may be sized to fit only an electronic vaping device. Or, the depth may be sized so that it may accommodate a plurality of electronic vaping devices and/or other electronic devices.

The depths of the base portion 102 and the lid portion 106 may be equal or the depths of the base portion 102 and the lid portion 106 may differ. For example, one of the base portion 102 or the lid portion 106 may be cupped while the other portion may be relatively flat. Regardless of which portion is cupped—the base portion 102, the lid portion 106 or both the lid portion 102 and the base portion 106—the article carrier 100 is shaped to house electronic devices when the base portion 102 and the lid portion 106 are joined together in a closed configuration.

Referring to FIG. 2, when the article carrier 100 is in the closed configuration, the base portion 102 forms a seam 134 with the lid portion 106. For example, the edges of the base portion 102 contact edges of the lid portion 106. In the present example embodiment, the seam 134 encircles the entire article carrier 100. It is not required that the seam extend continuously around the article carrier 100. In alternative example embodiments, the seam 134 may be intermittent in that the base portion 102 may be in intermittent contact with the lid portion 104. The edge 104a of either the base portion 102 or the edge 108a of the lid portion 106 may be lipped so that the either the edge 104a of the base portion 102 or the edge 108a of the lid portion 106 is in a nested configuration when the article carrier 100 is in a closed configuration, i.e., when the edges 104a and 108a are brought in contact with each other.

When the article carrier 100 is closed, clips 144a and 144b lock the base portion 102 to the lid portion 106. For example, when an elastomeric material is used for the hinge 110, the hinge may be configured to be biased in an open configuration. In the case that the article carrier 100 may be molded of a single material, any biasing of the lid portion 104 relative to the base portion 102 is in an open position. As such, to maintain the article carrier in a closed configuration, the clips 144a and 144b may engage with the latches 103 and 105. The clips 144a and 144b provide a locking force to oppose the biasing nature of the lid portion 104. It is not necessary that the case open to as wide as possible. A slight opening via the biasing of the lid portion may be helpful to a holder of the article carrier 100.

With continued reference to FIG. 2, the hinge 110 connects the base portion 102 to the lid portion 106 at the edge regions 104 and 108. The hinge 110 may be attached to each of the edge regions 104 and 108 any number of ways. For example, the hinge 110 may be attached to the base portion 102 and the lid portion 106 by being directly molded to the edge first and second edge regions 104 and 108. It is not necessary that the hinge be attached to the edges 104a and 108a.

The hinge 110 may also be a separate article that is attached by an adhesive or by a mechanical connection such as a grommet-recess connection. For example, a grommet on the hinge 110 may engage a hole or recess on the edge region 104 and/or 108 or vice versa—a grommet on the edge region 104 and/or 108 may engage a hole or recess on the hinge 110.

Figure 5:
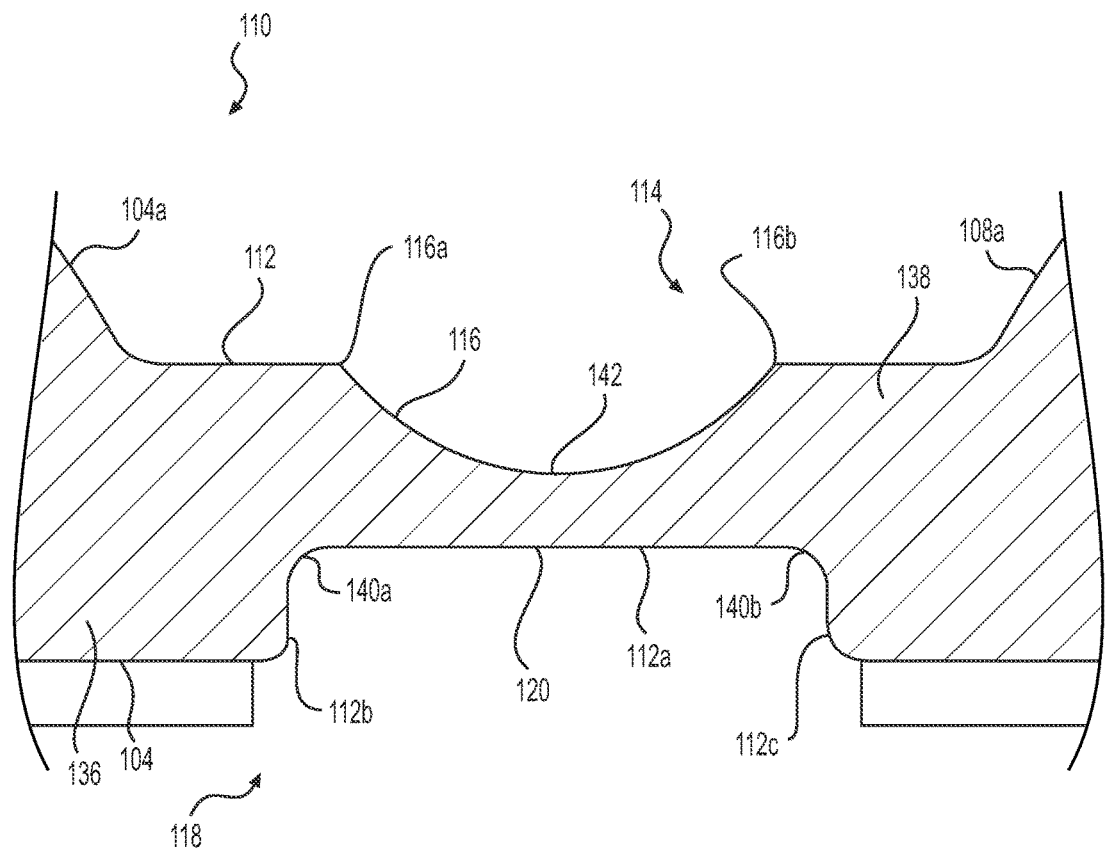
FIG. 5 illustrates a cross-sectional view of a section of the article carrier for an electronic device in an open configuration.

Referring to FIG. 5, the hinge 110 includes a first anchor portion 136 and a second anchor portion 138 and a connector band 112. The anchor portions 136 and 138 connect the hinge to the first edge region 104 of the base portion 102 and the second edge region 108 of the lid portion 106. The anchor portions 136 and 138 are integral with the edge regions 104 and 108 and therefore are similarly sized. In alternative embodiments where the anchor portions 136 and 138 are heterogeneous to the edge regions 104 and 108, the size of the anchor portions may differ from the size of the edge regions.

In the present example embodiment, the article carrier 100 is a one-piece molded material. However, as discussed in more detail below, other embodiments may be configured with the hinge 110 as an article separate from the base portion 102 and/or the lid portion 106.

The connector band 112 of the hinge 110 may have a non-uniform cross-section. For example, the connector band 112 may have a recessed top surface 114 and a relieved lower surface 118.

The hinge 110 is made of a generally resilient material such as rubber or some other elastomer. The connector band 112 may be made to undergo significant deformation after which it may return to its original shape. The anchor portions 136 and 138 may be made of the same material as the connector band 112 or they may be made of a different material such as plastic or a non-elastic material. For example, the article carrier 100 may be made entirely of polypropylene.

The recessed top surface 114 includes a recess 116. And the relieved lower surface 118 includes a relief 120 for receiving the first edge region 104 and the second edge region 108.

The recess 116 is generally semi-circular and is equidistant between the anchor portions 136 and 138. The semi-circular configuration is present when the article carrier 100 is in an open configuration as shown in FIG. 5. However, when the article carrier 100 is in a closed configuration, the recessed top portion 116 is deformed as discussed in more detail below.

Figure 6:
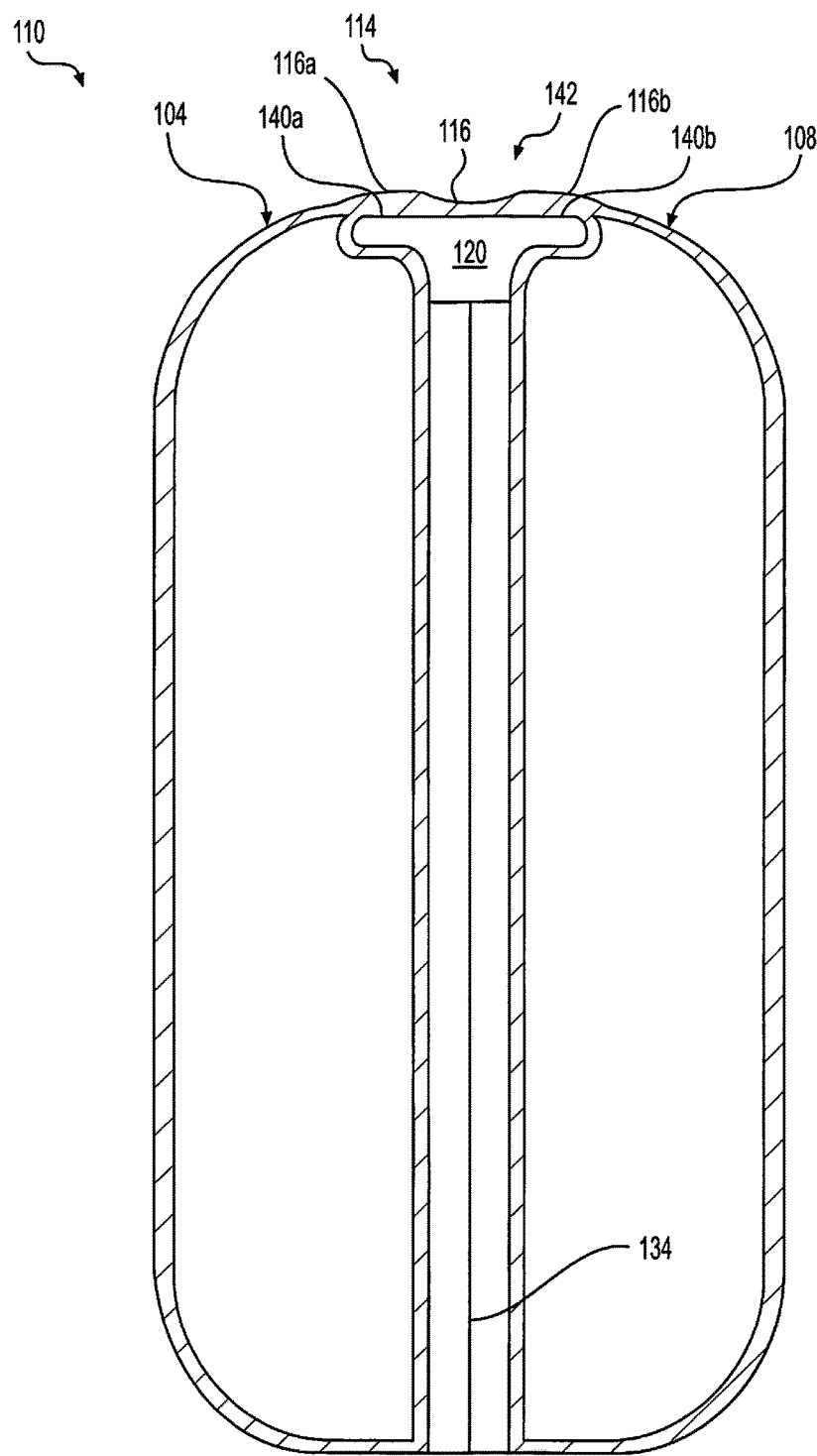
FIG. 6 illustrates a cross-sectional schematic view of the section of the article carrier for an electronic device in a closed configuration.

FIG. 6 shows a cross-sectional view of the example embodiment shown in FIG. 2. In FIG. 6, the relieved lower surface 118 has a relief 120 that has a generally rectilinear cross section. The cross-section of the relief 120 may be any shape other than rectilinear, e.g., arcuate or polygonal. The relief should be able to receive the edge regions 104 and 108 of the base portion 102 and lid portion 106.

As shown in FIG. 6, cross-section of the relief 120 may have a configuration similar to that of a cross-section of the edge regions 104 and 108. The connector band 112 has a width that is at least as long as a thickness of the first edge region 104 plus a thickness of the second edge region 108. For example, edge regions 104 and 108 that are generally rectangular may be configured to have a similar cross-section as the section of the relief 120. The edge regions 104 and 108 may fit snugly into the relief when the carrier 100 is in a closed configuration. The cross-section of the relief 120, therefore, may correspond with the shape of the edge regions 104 and 108.

The connector band 112 of the present example embodiment is sufficiently thick to provide a strong hinge. For example, in an article carrier having a base portion that is nine millimeters deep and a lid portion that is also nine millimeters deep, it is acceptable for the hinge to have a 0.2 millimeter thickness, within about ±0.05 mm, at its shallowest point between the recess 116 and the relief 120 (measured from a recess nadir 142 to a relief upper surface 112a). The anchor portions may have a thickness of more than about 0.5 mm. In an example embodiment having these dimensions, a width of the relief 120 is about equal to a diameter of the recess 116. I.e., the relief 120 may have a width of about 1.5 millimeters (measured from a first relief end 112b to second relief end 112c) and the recess 116 may have a radius of about 0.75 millimeters measured on a curve extending from a first recess edge 116a to a second recess edge 116b between 0.2 and 0.4 millimeters deep. The entire hinge, including both anchor portions, may have a width of about 2.25 millimeters, which represents the distance between the edge 104a of the first base portion 104 and the edge 108a of the second base portion 108a. These dimensions serve as an example to aid in understanding dimensional relationships in the article carrier 100 and are not limiting.

The present connector band 112 withstands shear and torsional forces more easily than a hinge having a thin, uniform cross-section. Regardless of the thickness of example embodiments, however, the hinge 110 has an extremely low profile when the article carrier 100 is in a closed configuration.

Whether the hinge is visible from a perspective parallel to the axis of rotation of the base portion 102 and the lid portion 106 depends on how the hinge is anchored in the edge region 104 and the edge region 108. For example, when the article carrier 100 is closed, the recess 116 is stretched from its curved configuration into a flat configuration as shown in FIG. 6. There are three flex points in the hinge 110—a first flex point 140a that connects a first side of the connector band 112 to the first anchor portion 136, a second flex point 140b that connects a second side of the connector band 112 to the second anchor portion 138, and the recess nadir 142. For example, when the connector band 112 is responding to a closing action of the article carrier 100, the connector band 112 stretches out the recessed top surface 114.

As can be seen in FIGS. 5 and 6, the recess 116 extends from a first recess edge 116a to a second recess edge 116b. The recess 116 is curved into the recessed top surface and extends between the first and second recess edges 116a and 116b. When the article carrier 100 is closed, the first and second recessed edges 116a and 116b are stretched apart and move toward creating a linear relationship with the recess nadir 142

The flat configuration of the recess 116, i.e., the linear relationship between first and second recessed edges 116a and 116b and the recess nadir 142, causes the recessed top surface 114 of the connector band 112 to deform such that it is tangential or near to tangential to a surface of the edge regions 104 and 108. The result is that the recessed top surface 114 is generally flush with the surface of the article carrier 100. This flushness provides a smooth, uniform surface around the entire article carrier 100. Previous article carriers incorporated hinge designs having two flaps. Each flap extended from a base and a lid, respectively. The flaps were joined together in a lambda configuration. The point of the "lambda" extended away from the base and lid and created an incongruous protrusion on the surface of the container preventing any flushness on the container.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An article carrier for an electrical device comprising: a base portion including a first edge region having a first relief end;
a lid portion including a second edge region having a second relief end; and
a hinge including a connector band, the connector band connecting the first edge region to the second edge region, and having a non-uniform cross-section, a first surface and a second surface opposing the first surface, the second surface defining a relief, the defined relief configured to receive the first relief end and the second relief end if the lid portion is in a first position; wherein the first surface defines a recess; and wherein the defined recess is generally curved in a second position and is configured to be generally planar in the first position.

2. The article carrier of claim 1, further comprising:
a first flex point at a first end of the defined relief, the first relief end having a first distance between the first flex point and a first surface of the first edge region;
a second flex point at a second end of the defined relief, the second relief end having a second distance between the second flex point and a second surface of the second edge region; and
wherein the defined relief has third distance that is at least as long as a combined first distance and second distance.

3. The article carrier of claim 1, further comprising:
a first flex point at a first end of the defined relief, the first relief end having a first distance between the first flex point and a first surface of the first edge region;
wherein the defined relief has a second distance that is at least as long as the first distance.

4. The article carrier of claim 1, wherein the base portion further comprises:
an outer surface adjacent the first edge region,
wherein in the first position, the outer surface is substantially tangential to the connector band.

5. The article carrier of claim 1, wherein the connector band comprises an elastomeric material.

6. The article carrier of claim 5, wherein the connector band comprises a rubber or a plastic.

7. The article carrier of claim 1, further comprising:
a plurality of device component receptacles on an interior of the base portion.

8. The article carrier of claim 7, wherein at least one of the receptacles is configured to retain an electronic vaping device power cartridge.

9. The article carrier of claim 7, wherein at least one of the receptacles is configured to retain an electronic vaping device pre-vapor formulation cartridge.

10. The article carrier of claim 7,
wherein at least one of the receptacles is configured to retain a USB charging device.

11. An article carrier for an electrical device comprising:
a base portion including a first edge region;
a lid portion including a second edge region; and
a hinge including a connector band, the connector band connecting the first edge region to the second edge region, the connector band including,
a first surface defining a recess, wherein the defined recess is generally curved in a second position and is configured to be generally planar in a first position, and
a second surface opposing the first surface and including a first relief end having a first shape, a second relief end having a second shape, and a middle surface having a third shape, the middle surface connecting the first relief end to the second relief end, the third shape at least partially corresponding in shape to the first shape, and the third shape at least partially corresponding in shape to the second shape.

* * * * *